United States Patent
Nylander et al.

(10) Patent No.: US 8,788,662 B2
(45) Date of Patent: Jul. 22, 2014

(54) SYSTEMS AND METHODS FOR MANAGING TEMPORARY USERS OF A WIRELESS COMMUNICATION NETWORK

(75) Inventors: Tomas Nylander, Värmdö (SE); Mats Buchmayer, Stockholm (SE); Jari Vikberg, Järna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 148 days.

(21) Appl. No.: 13/121,959

(22) PCT Filed: Oct. 2, 2008

(86) PCT No.: PCT/SE2008/051121
§ 371 (c)(1),
(2), (4) Date: Mar. 31, 2011

(87) PCT Pub. No.: WO2010/039074
PCT Pub. Date: Apr. 8, 2010

(65) Prior Publication Data
US 2011/0179168 A1    Jul. 21, 2011

(51) Int. Cl.
*G06F 15/173* (2006.01)
*H04L 29/06* (2006.01)
*H04W 12/08* (2009.01)
*H04W 88/02* (2009.01)

(52) U.S. Cl.
CPC ........... *H04L 63/101* (2013.01); *H04W 88/02* (2013.01); *H04W 12/08* (2013.01)
USPC ............................ 709/225; 709/223; 709/226

(58) Field of Classification Search
USPC ................. 709/225; 455/411, 423, 442, 436; 380/277; 370/331
See application file for complete search history.

(56) References Cited

U.S. PATENT DOCUMENTS

| | | | |
|---|---|---|---|
| 6,334,052 B1 | 12/2001 | Nordstrand | |
| 2005/0114653 A1* | 5/2005 | Sudia | 713/158 |
| 2008/0254792 A1* | 10/2008 | Ch'ng | 455/435.1 |
| 2009/0005050 A1* | 1/2009 | Lee et al. | 455/442 |
| 2009/0094351 A1* | 4/2009 | Gupta et al. | 709/220 |
| 2009/0129339 A1* | 5/2009 | Young et al. | 370/331 |
| 2009/0296934 A1* | 12/2009 | Qing et al. | 380/277 |
| 2010/0075658 A1* | 3/2010 | Hou et al. | 455/422.1 |

FOREIGN PATENT DOCUMENTS

JP     2007164603 A    6/2007

OTHER PUBLICATIONS

3rd Generation Partnership Project. 3GPP TS 36.300, V8.5.0 (May 2008). 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), May 2008.
3rd Generation Partnership Project. "LS on Closed Subscriber Groups for LTE Home Cells." 3GPP TST RAN WG3 Meeting #57, R3-071320, Athens, Greece, Aug. 20-24, 2007.
Nokia Corporation et al., "HNB and HeNB Requirements," Mar. 31-Apr. 4, 2008, 3GPP TSG-RAN WG2 Meeting #61bis, R2-081527, Shenzen, China.

* cited by examiner

*Primary Examiner* — Andrew Lai
*Assistant Examiner* — Jamaal Henson
(74) *Attorney, Agent, or Firm* — Coats & Bennett, PLLC

(57) ABSTRACT

In some embodiments, the present invention relates to systems and methods for providing temporary access to a wireless communication network to user equipment (UE). More particularly, the present invention relates to systems and methods of handling a UE's access to a wireless communication network upon expiry of permission to access the network.

25 Claims, 9 Drawing Sheets

SYSTEMS AND METHODS FOR MANAGING TEMPORARY USERS OF A WIRELESS COMMUNICATION NETWORK

TECHNICAL FIELD

The present invention relates to wireless communication systems and methods.

BACKGROUND

Traditionally, a wireless communication network (e.g., a cellular telephone network) comprise a core network (CN) and a number of base stations (e.g., in LTE a eNodeB or home eNodeB (HeNB) and in WCDMA (3G) a NodeB or home NodeB (HNB), etc.) in two-way communication with the core network. A user equipment (UE) (e.g., a mobile telephone, pager, wireless internet card, etc.) accesses the core network via a connection with a base station.

The owner or operator of a base station or set of base stations may limit the UEs that may utilize the base stations. For example, an operator may grant to a guest permission to use a particular base station or set of base stations only on a temporary basis. For instance, a hotel operating a base station may wish to enable its guests to utilize the base station for the duration of their stay at the hotel, but end that access after the guests check out.

A problem exists with ending temporary access to a network. For instance, if access to a base station is immediately terminated upon the expiration of a UE's access rights, then the user of the UE might have an important communication interrupted, which both the network owner and the user may find undesirable. Thus, there exists a need for systems and methods of terminating more gracefully a UE's access to a network.

SUMMARY

According to one aspect of the present invention, a method for managing the temporary access of a UE in a wireless communication system is provided. According to some embodiments, the method includes the following steps: (1) detecting the expiration of the UE's right to access a set of nodes (e.g., a set of one or more base stations) and (2) transmitting an update message in response to detecting the expiration of the UE's access right, where the update message includes an identifier (e.g., a closed subscriber group (CSG) identifier) associated with the set of nodes and indicates that the identifier should be removed from a list containing one or more identifiers, each of which is associated with a set of nodes (e.g., a whitelist).

According to some embodiments, the step of transmitting the update message comprises: (1) paging the UE in response to detecting the expiry of the UE's access right and (2) transmitting the update message to the UE in response to receiving from the UE a response to the page.

In some embodiments, the method includes the step of terminating the UE's connection with a node that is included in the set of nodes. In some embodiments, the step of terminating the UE's connection with the node may include handing off the UE to a node that the UE has permission to access. In other embodiments, the step of terminating the UE's connection with the node may include allowing connection to continue for a certain amount of time or an indefinite amount of time before terminating the connection.

According to some embodiments of the present invention, the method further includes determining whether the UE is operating in an active mode (e.g., a mode in which the UE has at least one active connection with a node in the network) or an idle mode (e.g., a mode in which the UE does not have any active connections with any nodes in the network) in response to detecting the expiration of the UE's right to access the set of nodes. If the UE is operating in an idle mode, then the step of transmitting the update message may include paging the UE after detecting the expiry of the UE's access right and transmitting the update message in response to receiving from the UE a response to the page. Additionally, a base station that is a member of the CSG may be utilized to transmit the update message to the UE, and the method may further include causing the UE to stop camping on the base station if the UE does not automatically stop camping on the base station in response to the update message.

According to some embodiments of the present invention, the step of detecting the expiration of a UE's right to access the set of nodes is performed by a network node (e.g., core network node, a gateway, a base station). According to some embodiments of the present invention, the step of detecting the expiration of the UE's access right comprises receiving from an access control system a message indicating the expiration of the UE's access right.

In another aspect of the present invention, a network node is provided. The network node may comprise: an interface configured to enable the node to communicate with a UE and a processing unit coupled to the interface, where the processing unit comprises a memory storing a set of computer instructions, and the set of computer instructions includes computer instructions configured to: (a) detect the expiration of a UE's right to access a set of nodes and (b) transmit an update message to the UE in response to the detection of the expiry of the UE's access rights. The update message may include an identifier associated with the set of nodes and indicate that the UE should remove the identifier from a list containing one or more identifiers each of which is associated with a set of nodes (e.g., a whitelist).

In another aspect, the present invention provides a method of offering temporary access to a wireless network to a UE that maintains a whitelist. In some embodiments, the method includes the steps of: (1) adding to an access control database (a) an identifier relating to a set of nodes that the UE has permission to access and (b) information relating to a duration of that permission; (2) adding the identifier to the UE's whitelist; and (3) determining that the UE's permission to access the set of nodes has expired. The method may also include the step of instructing the UE to remove the identifier from the whitelist in response to determining that the UE's access rights have expired.

In some embodiments, after determining that the UE's permission to access the set of nodes has expired, a determination is made as to whether the UE is operating in an idle mode or an active mode, and a first action is taken if the UE is operating in an active mode and a second action is taken if the UE is operating in an idle mode. The second action may include paging the UE in response to detecting the expiry of the UE's access right and transmitting an update message to the UE in response to receiving from the UE a response to the page, where the update message causes the UE to remove the identifier from the whitelist. The first action may include causing the UE to be handed off to another node (e.g., a node that the UE has permission to access) or allowing the UE to continue in the active mode for a specified period of time (e.g., a fixed amount of time or an indefinite amount of time) and then causing the UE to enter an idle mode (e.g., terminating a connection between the UE and another node).

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements

DETAILED DESCRIPTION

In some embodiments, the present invention relates to systems and methods for providing temporary access to a wireless communication network to a user equipment (UE). More particularly, the present invention relates to systems and methods of handling a UE's connection to a wireless communication network upon expiration of the UE's permission to access the network.

Figure 1:
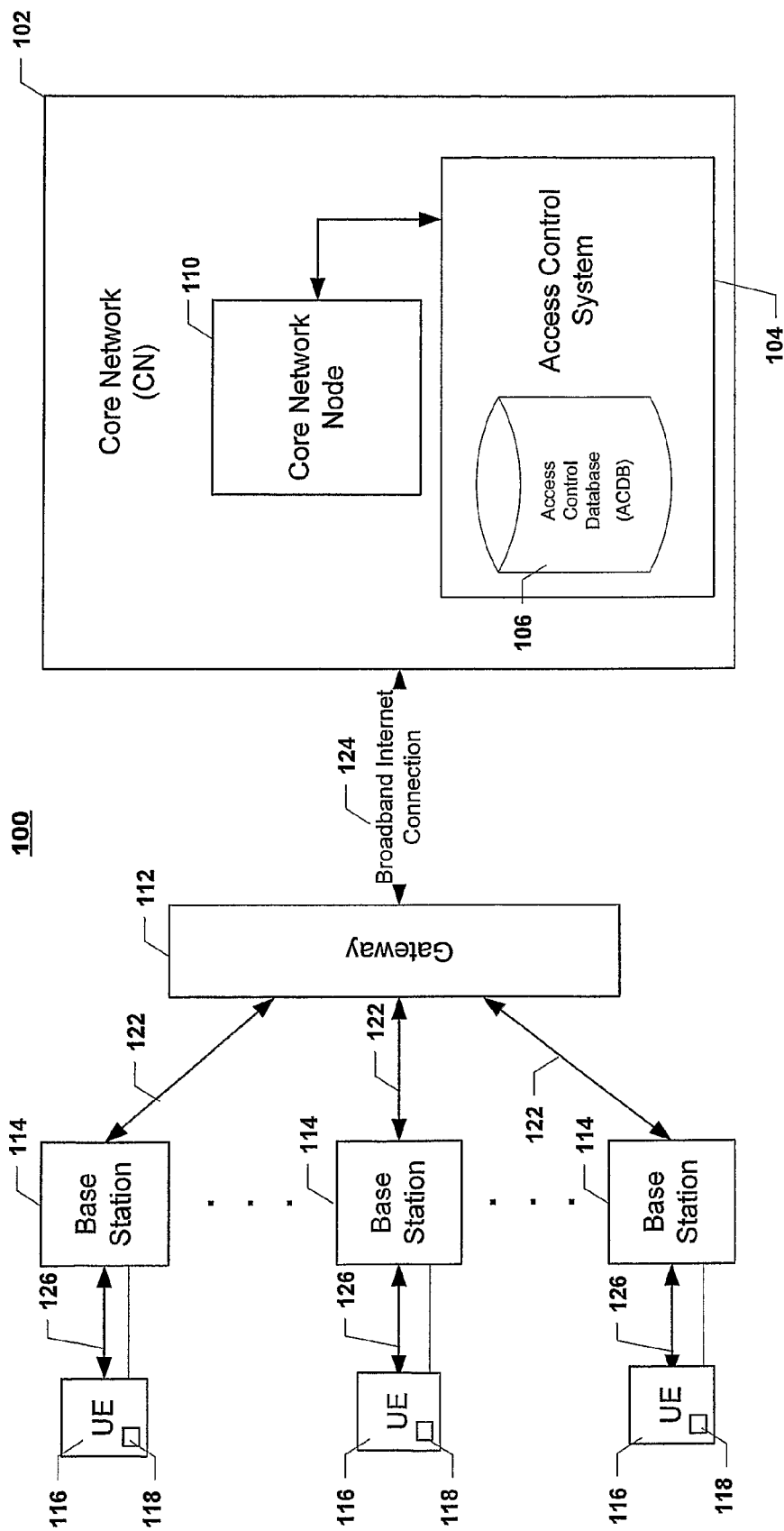
FIG. 1 depicts a function block diagram of a wireless communications network according to some embodiments of the present invention.

FIG. 1 depicts a functional diagram of an exemplary wireless network system 100 according to embodiments of the present invention. As shown, wireless network system 100 may comprise a core network (CN) 102. The CN 102 may comprise an access control system (ACS) 104 having an access control database 106. The CN 102 may also comprise a core network node 110 (e.g., a mobility management entity (MME) node, a mobile switching center (MSC), a serving general packet radio service (GPRS) support node (SGSN), etc.). The system may also comprise a plurality of UEs 116, each of which may have a whitelist 118.

Each UE 116 may be operable to connect to a base station 114 via an interface 126. In the case where base stations 114 are femto base stations (e.g., HeNBs or HNBs), base stations 114 may be connected to a femto base station gateway 112 (e.g., an HeNB gateway or HNB gateway) via a connection 122. A connection 124 connects the gateway 112 to the CN 102. According to some embodiments, connection 124 is a broadband internet connection, but one of ordinary skill in the art would understand that a number of suitable connections could be used.

Each whitelist 118 may contain a list of one or more CSG identifiers, each of which identifies a CSG. One or more base stations may be a member of a particular CSG. According to some embodiments of the invention where there is a single cell provided by a base station 114, the base station 114 can identify its membership in a particular CSG by transmitting CSG indicator information (e.g., a Boolean True or False type of indication) and the CSG identifier associated with the particular CSG. In other embodiments, a base station can provide multiple cells and, in this case, the CSG indicator and CSG identifier are sent separately for each cell.

When a UE 116 receives a CSG indicator message from a particular base station 114, the UE determines whether the CSG identifier included in the message is included in the UE's whitelist 118 to determine whether the UE has permission to utilize the services of the particular base station 114. The UE should be configured such that it does not attempt to connect to a base station that is not a member of any CSG identified in the UE's whitelist. Thus, in order to allow a UE to utilize (on a temporary or permanent bases) a base station that is a member of a particular CSG, it may be necessary to add to the UE's whitelist the CSG identifier associated with the particular CSG. Similarly, to prevent a UE from utilizing a base station that is a member of a particular CSG, it may be necessary to remove from the UE's whitelist the CSG identifier associated with the particular CSG.

Figure 2:
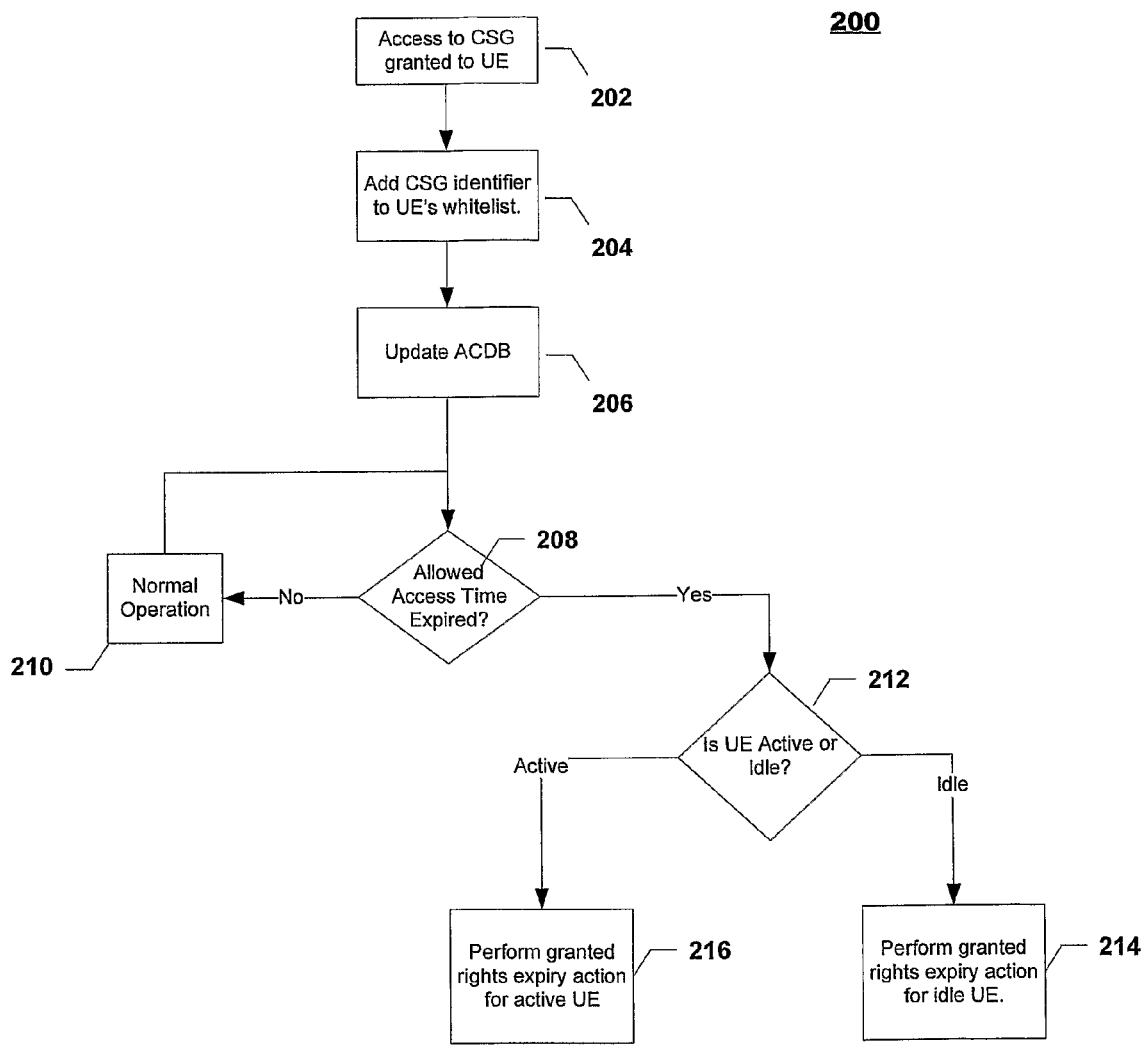
FIG. 2 depicts a logical flowchart of a method for providing a UE temporary access to a wireless network according to some embodiments of the present invention.

Referring now to FIG. 2, FIG. 2 is a flowchart illustrating a process 200 according to some embodiments of the present invention. Process 200 may begin in step 202, where a determination is made to grant to a UE access to a CSG. Next (step 204), the CSG's identifier is added to the UE's whitelist 118. Additionally, information can be added to an access control database (ACDB) 106 indicating that the UE has been given permission to access the CSG (step 206). If the UE has been given only temporary permission to access the CSG, then the information added to the database may include information indicating when such temporary permission expires. According to some embodiments of the present invention, the ACDB is part of the ACS 104. One of ordinary skill in the art, however, would understand that the ACDB could be maintained by another component of the network or be its own stand alone system.

In step 208, a determination is made as to whether the UE's permission to access the CSG has expired. If it has not expired, then normal operation continues (step 210), otherwise process 200 proceeds to step 212.

Figure 3:
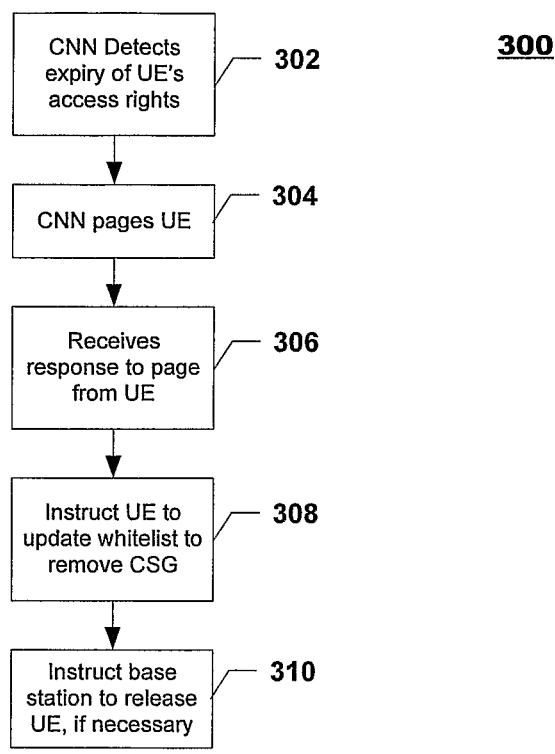
FIGS. 3-8 are flow charts illustrating various methods according to different embodiments of the present invention.
Figure 4:
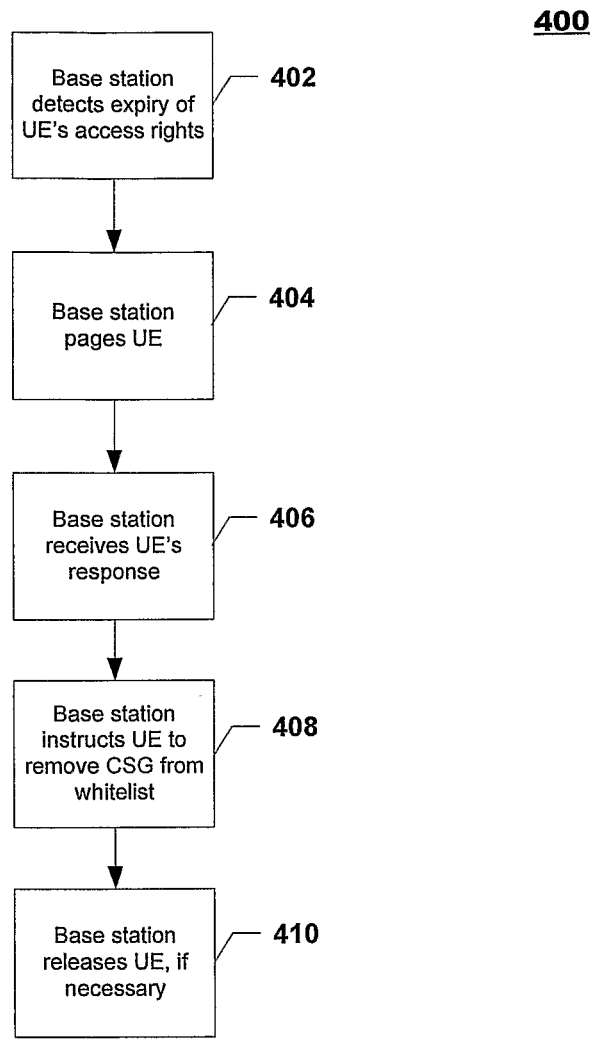
Figure 5:
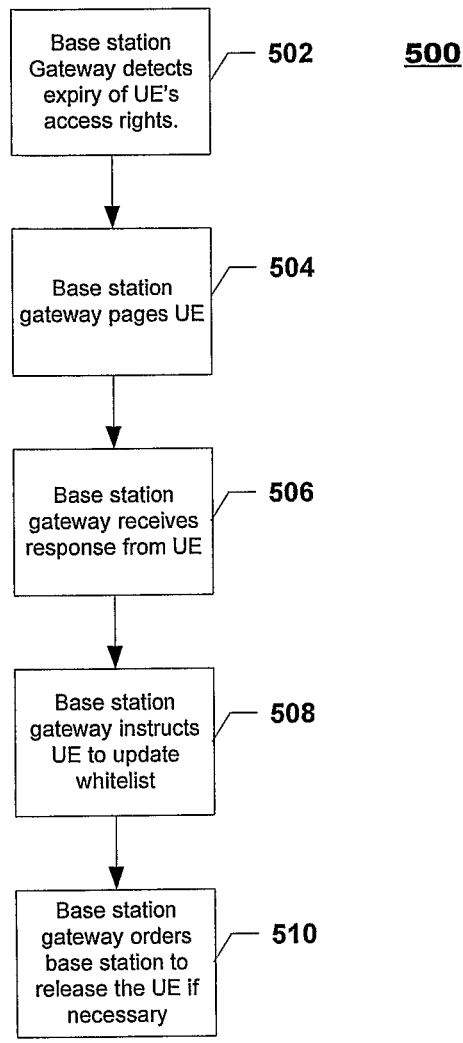
Figure 6:
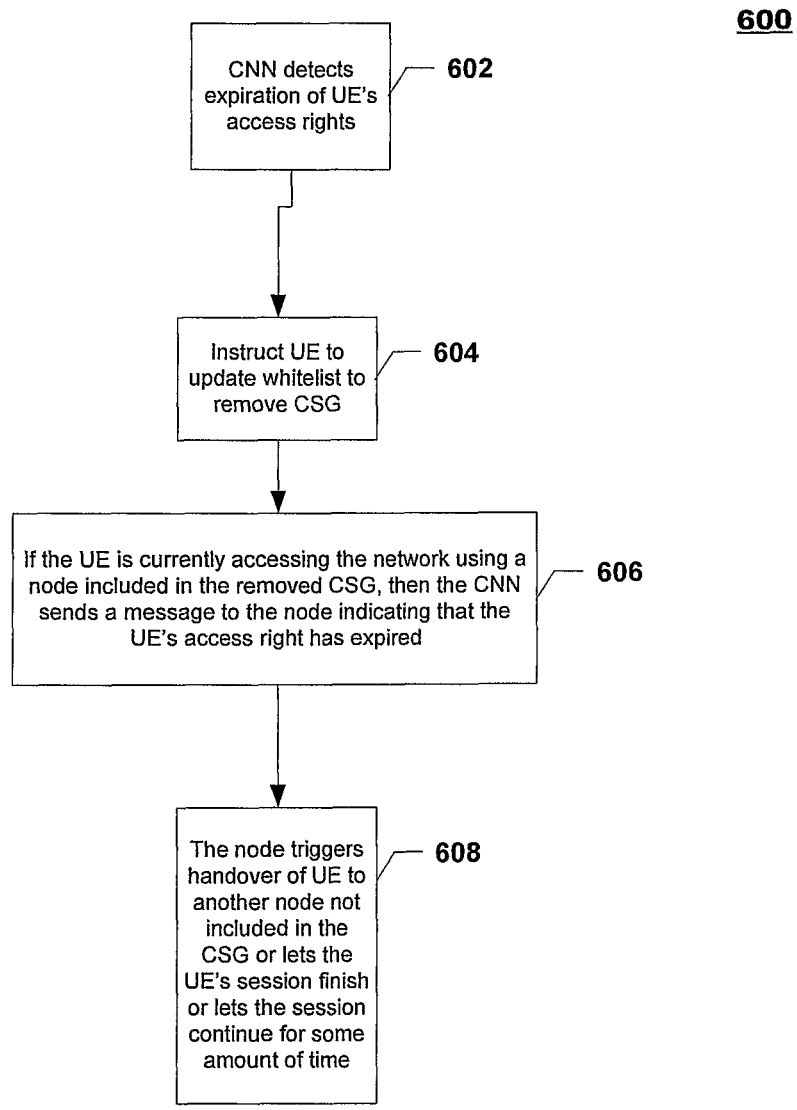
Figure 7:
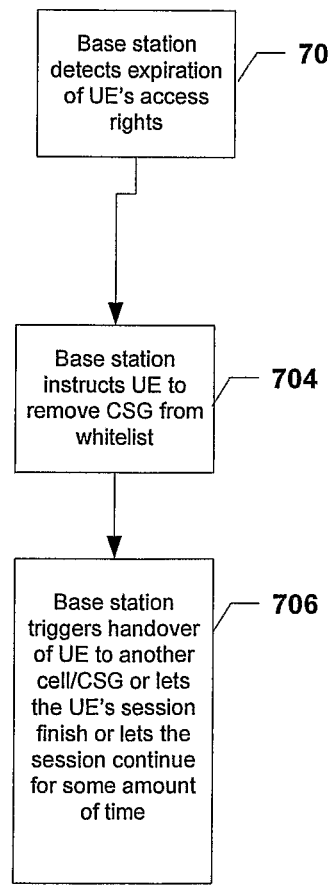
Figure 8:
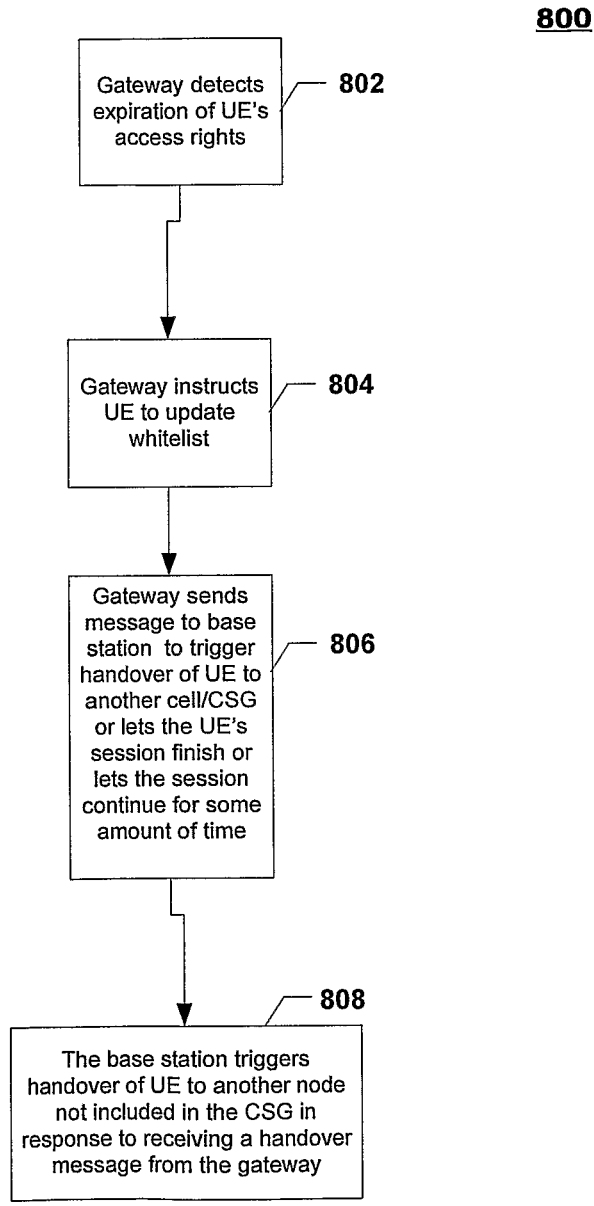

In step 212 a determination is made as to whether the UE is operating in an active mode or idle mode. If it is determined that the UE is operating in an idle mode (e.g., the UE does not have any active connections with any nodes in the network), an appropriate action can be taken for an idle UE (step 214). FIGS. 3-5 are flow charts illustrating different actions that can be taken when an idle UE's access rights expire. Similarly, if it is determined that the UE is operating in an active mode (e.g., the UE has an active connection with a node in the network), then an appropriate action for an active UE can be taken (step 216). FIGS. 6-8 are flow charts illustrating different actions that can be taken when an active UE's access rights expire. Preferably, the actions taken in step 214 are different than the actions taken in step 216.

Referring now to FIG. 3, FIG. 3 depicts a method 300, according to embodiments of the present invention, of dealing with the expiration of access right permission when the UE is operating in an idle mode at the time of the permission expiry. Process 300 may begin in step 302, where a core network node (CNN) 110 detects the expiry of the UE's right to access the CSG. In some embodiments, core network node 110 detects the expiry of the UE's right to access the CSG by receiving from ACS 104 a message indicating that the UE's permission to access the CSG has expired. In other embodiments (e.g., embodiments where core network node 110 maintains an ACDB 106), core network node 110 itself detects the expiry of the UE's right to access the CSG by keeping track of when the UE's permission expires.

In embodiments where ACS 104 keeps track of the expiration of access rights, it may be necessary for a network node to inform the ACS that the ACS should notify the network node in the event that the UE's permission expires. That is, the ACS needs to know which network nodes to inform. This can be accomplished by having a network node to which the UE is currently connected inform the ACS that the UE is connected to the network node. For example, in response to the UE accessing the network node, the network node should inform the ACS that the UE is connected to the network node. In this manner, The ACS may be informed about which node is currently handling the UE so that at expiry of the access right the ACS can inform the appropriate node.

In response to detection of the expiration of the UE's access right, core network node 110 pages the UE 116 (step 304). In step 306, if the UE is present in the network, core network node 110 receives from the UE a response to the page (e.g., the UE answers the page and RRC and S1AP "connections" are established for the UE in the case where the network is operating using evolved universal terrestrial radio access network (E-UTRAN) and evolved packet core (EPC), also called long term evolution/system architecture evolution (LTE/SAE, standards). In step 308, in response to the UE answering the page, core network node 110 instructs the UE to remove the CSG identifier from its whitelist. For example, in step 308, core network node 110 may transmit to the UE a message that contains the CSG identifier and causes the UE to remove the CSG identifier from the UE's whitelist. That is, core network node 110 may transmit to the UE a non-access stratus (NAS) level update of the whitelist indicating that the particular CSG is removed. In response, the UE should update its CSG whitelist and, if the base station to which it is connected is a member of the CSG, then stop camping on the base station and start searching for other cells on which to camp.

In step 310, core network node 110 may instruct a base station to release the UE if the UE does not stop camping on the base station and the base station is a member of the CSG. One of ordinary skill in the art would understand that step 310 is unnecessary if the UE is not connected to any base station that is a member of the CSG to which its access permission has expired (e.g., if the UE is camping on a different CSG or on a cell without CSG).

Referring now to FIG. 4, FIG. 4 depicts a method 400, according to embodiments of the present invention, of dealing with the expiration of access right permission when the UE is operating in an idle mode at the time of the permission expiry. Process 400 may begin in step 402, where a base station 114 detects the expiration of the UE's access rights. In some embodiments, base station 114 detects the expiry of the UE's right to access the CSG by receiving from ACS 104 a message indicating that the UE's permission to access the CSG has expired. In other embodiments (e.g., embodiments where base station 114 maintains an ACDB 106), base station 114 itself detects the expiry of the UE's right to access the CSG.

In response to detection of the expiration of the UE's right to access the CSG, the base station pages the UE 116 (step 404). In step 406, if the UE is present on the base station, the base station will receive from the UE a response to the page (e.g., an RRC connection is established between the UE and the base station). In step 408, in response to receiving from the UE the response to the page, the base station instructs the UE to remove the CSG identifier from its whitelist. For example, in step 408, the base station may transmit to the UE a message that contains the CSG identifier and causes the UE to remove the CSG identifier from the UE's whitelist. That is, the base station may transmit to the UE a RRC level (or NAS level) update of the whitelist indicating that the particular CSG is removed. In step 410, if the base station is part of the CSG and the UE does not stop camping on the base station, the base station may release the UE or redirect the UE to another base station.

Referring now to FIG. 5, FIG. 5 depicts a method 500, according to embodiments of the present invention, of dealing with the expiration of access right permission when the UE is operating in an idle mode at the time of the permission expiry. Process 500 may begin in step 502, where a gateway 112 detects the expiry of the UE's right to access the particular CSG. In some embodiments, gateway 112 detects the expiry of the UE's right to access the CSG by receiving from the access control system a message indicating that the UE's permission to access the CSG has expired. In other embodiments where gateway 112 maintains a ACDB 106, gateway 112 itself detects the expiry of the UE's right to access the CSG.

In response to detection of the expiration of the UE's right to access the CSG, gateway 112 pages the UE 116 (step 504). In step 506, if the UE is present on any of the base stations used to page the UE, then gateway 112 will receive from the UE a response to the page (e.g., the UE answers the page and RRC and S1AP "connections" are established for the UE).

In step 508, in response to the UE answering the page, gateway 112 instructs the UE to remove the CSG identifier from its whitelist. For example, in step 508, gateway 112 may transmit to the UE a message that contains the CSG identifier and causes the UE to remove the CSG identifier from the UE's whitelist. That is, gateway 112 may transmit to the UE a NAS level update of the whitelist indicating that the particular CSG is removed or sends to the base station to which the UE is connected a S1AP message that causes the base station to send a whitelist update message to the UE on the RRC level. In response, the UE should update its CSG whitelist and, if the base station to which it is connected is a member of the CSG, then stop camping on the base station and search for other cells on which to camp.

In step 510, gateway 112 may instruct a base station to release or redirect the UE if the base station is part of the CSG and the UE does not stop camping on the base station.

Referring now to FIG. 6, FIG. 6 depicts a method 600 of handling the expiration of a UE's right to access a particular CSG when the UE is operating in an active mode according to embodiments of the present invention. Method 600 may begin in step 602, where a core network node 110 detects the expiry of the UE's right to access the CSG.

In step 604, core network node 110 instructs the UE to remove the CSG identifier from its whitelist. For example, in step 604, core network node 110 may transmit to the UE a message that contains the CSG identifier and causes the UE to remove the CSG identifier from the UE's whitelist. That is, core network node 110 may transmit to the UE a NAS level update of the whitelist indicating that the particular CSG is removed. In response, the UE should update its CSG whitelist but stay in the CSG cell as the UE is in the active mode.

If the UE is currently accessing the network using a base station that is a member of the removed CSG, then core network node 110 sends to the base station to which the UE is connected a message indicating that the UE's access right has expired (step 606). For example, core network node 110 may send to the base station a "perform handover" message.

In response, the base station should trigger a handover of the UE to another base station 114 that the UE 116 still has the right to access (step 608). The handover may be based on UE provided measurement reports about the quality of target cells. Preferably, a target cell that operates on a frequency different than the frequency on which the base station operates is selected to avoid interference.

Alternatively, in response to the message transmitted in step 606, the base station may allow the UE's current session to terminate normally, at which point idle mode handling could be applied as discussed above (e.g., the UE could be redirected away from the base station if the UE camps on the base station while in the idle mode). This alternative may be employed, for example, if there are no suitable target cells to which the UE can be handed over. In another alternative, the base station may allow the UE's current session to continue for some fixed amount of time before terminating the session or it may allow the session to continue for an indefinite amount of time. In yet another alternative, the base station could terminate the session immediately in response to receiving the message transmitted in step 606.

Referring now to FIG. 7, FIG. 7 depicts a method 700 of handling the expiration of a UE's right to access a particular CSG when the UE is operating in an active mode according to embodiments of the present invention. Method 700 may begin in step 702, where an base station 114 detects the expiry of the UE's right to access the CSG.

In step 704, the base station instructs the UE to remove the CSG identifier from its whitelist. For example, in step 704, the base station may transmit to the UE a message that contains the CSG identifier and causes the UE to remove the CSG identifier from the UE's whitelist. That is, the base station may transmit to the UE a RRC level update of the whitelist indicating that the particular CSG is removed. In response, the UE should update its CSG whitelist but stay in the CSG cell as the UE is in the active mode.

Next (step 706), the base station triggers a handover of the UE to another base station 114 that the UE 116 still has the right to access. The handover may be based on UE provided measurement reports about the quality of target cells. Preferably, a target cell that operates on a frequency different than the frequency on which the base station operates is selected to avoid interference. Alternatively, the base station may allow the UE's current session to terminate normally, at which point idle mode handling could be applied as discussed above. This alternative may be employed if there are no suitable target cells to which the UE can be handed over. In another alternative, the base station may allow the UE's current session to continue for some fixed amount of time before terminating the session or it may allow the session to continue for an indefinite amount of time. In yet another alternative, the base station could terminate the session immediately.

Referring now to FIG. 8, FIG. 8 depicts a method 800 of handling the expiration of a UE's right to access a particular CSG when the UE is operating in an active mode according to embodiments of the present invention. Method 800 may begin in step 802, where a gateway 112 detects the expiry of the UE's right to access the CSG.

In step 804, the gateway instructs the UE to remove the CSG identifier from its whitelist. For example, the gateway may transmit to the UE a NAS level update of the whitelist indicating that the particular CSG is removed. In response, the UE should update its CSG whitelist but stay in the CSG cell as the UE is in the active mode. Alternatively, the gateway may send to the base station to which the UE is connected a S1AP message that causes the base station to send to the UE on the RRC level a whitelist update message.

If the UE is currently accessing the network using a base station that is a member of the removed CSG, then the gateway sends to the base station to which the UE is connected a message indicating that the UE's access right has expired (step 806). For example, the gateway may send to the base station a "perform handover" message.

In response, the base station should trigger a handover of the UE to another base station 114 that the UE 116 still has the right to access (step 808). Alternatively, the base station may allow the UE's current session to terminate normally, at which point idle mode handling could be applied as discussed above, or the base station could terminate the session immediately. In another alternative, the base station may allow the UE's current session to continue for some fixed amount of time before terminating the session or it may allow the session to continue for an indefinite amount of time.

Figure 9:
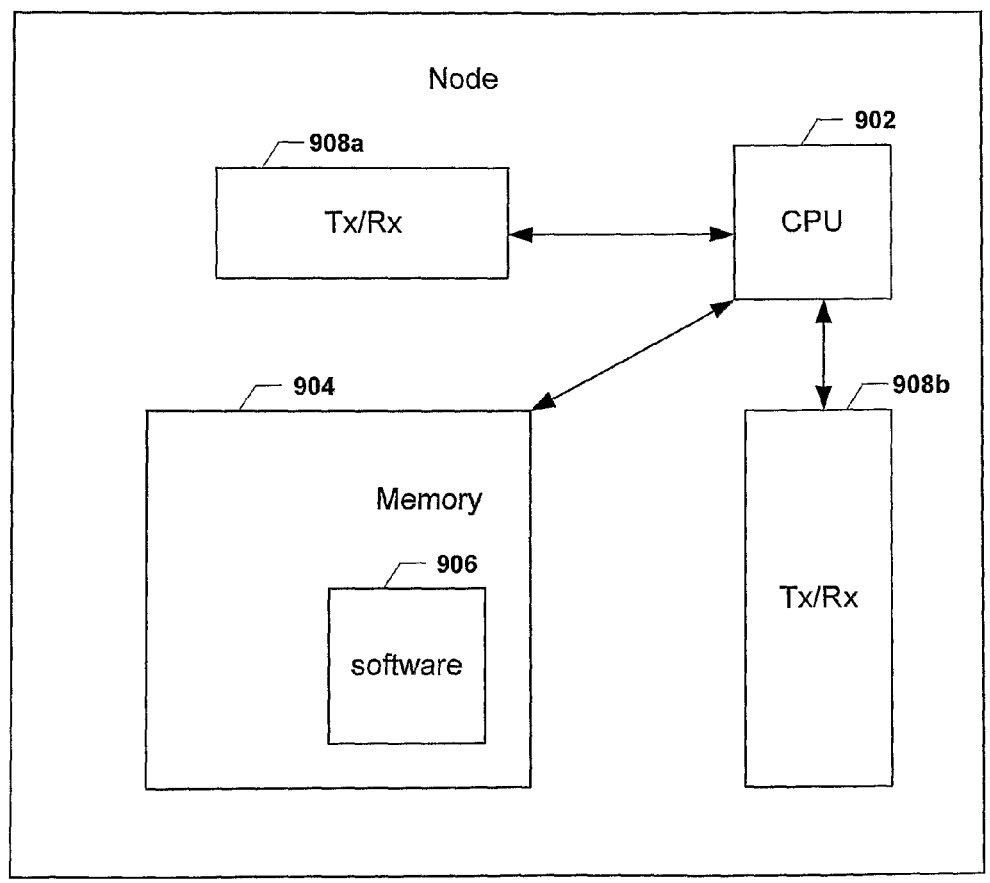
FIG. 9 depicts a functional block diagram of a node according to embodiments of the present invention.

FIG. 9 depicts a network node 900 (e.g., base station, core network node, gateway, etc.) according to embodiments of the present invention. In general, the node 900 may comprise a CPU 902, memory 904 and computer software 906 stored on the memory 904. The node also may comprise transmit/receive (Tx/Rx) circuitry 908a,b. According to some embodiments of the present invention different Tx/Rx circuitry can be used to connect to different components of the network. For instance, a node operating as a base station 114 might have Tx/Rx circuitry 908a dedicated to communicating with UE 116 and different Tx/Rx circuitry 908b dedicated to communicating with the CN 102 (or with gateway 112). One of ordinary skill in the art, however, would recognize that the same circuitry could be used to communicate with both the UE 116 and the CN 102.

Software 906 is configured such that when processor 902 executes software 906, node 900 performs steps described above with reference to the flow charts shown in FIGS. 2-8. For example software 906 may include: computer instructions for detecting the expiration of the UE's right to access a set of nodes; computer instructions for transmitting a whitelist update message to the UE in response to detecting the expiration of the UE's access right; computer instructions for determining whether the UE is in an idle mode or active mode; and computer instructions for transmitting a message to a base station in response to detecting the expiration of the UE's access right, where the message may instruct the base station to hand off the UE to another base station.

While the processes described herein have been illustrated as a series or sequence of steps, the steps need not necessarily be performed in the order described, unless explicitly indicated otherwise.

Further, while various embodiments of the present invention have been described above, it should be understood that they have been presented by way of example only, and not limitation. Thus, the breadth and scope of the present invention should not be limited by any of the above-described exemplary embodiments.

The invention claimed is:

1. A method for managing temporary access of a user equipment (UE) in a wireless communication system, said method comprising:
   detecting the expiration of a right of the UE to access a set of nodes; and
   in response to detecting said expiration, allowing any current session that the UE has with a node included in the set of nodes to continue after said expiration, but transmitting to the UE an update message that includes an identifier associated with the set of nodes and that instructs the UE to remove the identifier from a list containing identifiers of sets of nodes to which the UE currently has a right to access.

2. The method of claim 1, further comprising determining whether the UE is operating in an active mode or an idle mode.

3. The method of claim 2, wherein, if it is determined that the UE is operating in an active mode and has a connection with a node included in the set of nodes, then terminating the UE's connection with the node.

4. The method of claim 3, wherein said terminating comprises handing off the UE to another node that the UE has permission to access.

5. The method of claim 3, wherein said terminating comprises allowing the connection to continue for a certain or indefinite amount of time before terminating the connection.

6. The method of claim 2, wherein, if the UE is operating in an idle mode, said transmitting comprises paging the UE after detecting said expiration and transmitting the update message in response to receiving a response to the page from the UE.

7. The method of claim 6, wherein said transmitting comprises transmitting the update message via a base station and, after transmitting the update message, instructing the base station to release the UE if the UE does not automatically stop camping on the base station in response to the update message.

8. The method of claim 1, wherein said detecting is performed by a network node.

9. The method of claim 8, wherein said detecting comprises receiving a message from an access control system.

10. The method of claim 8, wherein the network node is one of a gateway, a core network node, and a base station.

11. The method of claim 1, wherein said allowing comprises allowing said current session to continue even after said expiration and even after transmitting the update message to the UE.

12. The method of claim 11, wherein said allowing comprises allowing said current session to terminate normally, irrespective of said expiration, after transmitting the update message to the UE.

13. A network node comprising:
an interface configured to enable the network node to communicate with a user equipment (UE); and
a processing unit coupled to the interface and configured to:
detect the expiration of a right of the UE to access a set of nodes; and
in response to detection of said expiration, allow any current session that the UE has with a node included in the set of nodes to continue after said expiration, but transmit to the UE an update message that includes an identifier associated with the set of nodes and that instructs the UE to remove the identifier from a list containing identifiers of sets of nodes to which the UE currently has a right to access.

14. The network node of claim 13, wherein the processing unit is further configured to determine whether the UE is operating in an active mode or an idle mode.

15. The network node of claim 14, wherein the processing unit is further configured to page the UE in response to a determination that the UE is operating in the idle mode.

16. The network node of claim 15, wherein the processing unit is further configured to instruct a node included in the set of nodes to release the UE and thereby cause the UE to stop camping on that node.

17. The network node of claim 14, wherein the processing unit is further configured to terminate the UE's connection with a node included in the set of nodes.

18. The network node of claim 17, wherein the processing unit is configured to terminate the UE's connection by handing off the UE to another node to which that the UE has permission to access, if the UE is operating in the active mode.

19. The network node of claim 17, wherein the processing unit is configured to wait a specified amount of time before terminating the connection.

20. The network node of claim 13, wherein the processing unit is configured to detect said expiration by receiving a message from an access control system.

21. The network node of claim 13, wherein the network node is one of a gateway, a core network node, and a base station.

22. A method of offering to a user equipment (UE) that maintains a whitelist temporary access to a wireless network, said method comprising:
adding to an access control database an identifier relating to a set of nodes that the UE has permission to access and information relating to a duration of that permission;
adding the identifier to the UE's whitelist;
determining that the UE's permission to access the set of nodes has expired; and
after determining that the UE's permission to access the set of nodes has expired, determining whether the UE is operating in an idle mode or an active mode, and taking a first action if the UE is operating in an active mode and a second action if the UE is operating in an idle mode, wherein both the first action and the second action comprise allowing any current session that the UE has with a node included in the set of nodes to continue after said expiration, but instructing the UE to remove the identifier from the whitelist.

23. The method of claim 22, wherein the second action further comprises paging the UE prior to instructing the UE to remove the identifier from the whitelist.

24. The method of claim 22, wherein the first action comprises handing off the UE to a node for which the UE has access permission.

25. The method of claim 22, wherein the first action comprises waiting a specified amount of time and then terminating a connection between the UE and a node in the set of node, to thereby cause the UE to enter the idle mode.

* * * * *